(12) United States Patent
Dale (10) Patent No.: US 8,276,493 B2
(45) Date of Patent: Oct. 2, 2012

(54) SAWHEAD VERTICAL ADJUSTING FRICTION WINCH AND SELF-LOCKING/BRAKING SYSTEM FOR SAWMILL

(75) Inventor: Peter Dale, Kilworthy (CA)

(73) Assignee: Norwood Industries Inc., Kilworthy, Ontario (CA)

( * ) Notice: Subject to any disclaimer, the term of this patent is extended or adjusted under 35 U.S.C. 154(b) by 13 days.

(21) Appl. No.: 12/949,877

(22) Filed: Nov. 19, 2010

(65) Prior Publication Data
US 2011/0138985 A1   Jun. 16, 2011

(30) Foreign Application Priority Data
Dec. 8, 2009   (CA) ..................................... 2687622

(51) Int. Cl.
*B27B 15/02* (2006.01)
(52) U.S. Cl. ............................................ 83/794; 83/788
(58) Field of Classification Search .................... 83/794, 83/795, 788; 192/224.1
See application file for complete search history.

(56) References Cited

U.S. PATENT DOCUMENTS

| 1,450,019 | A | * | 3/1923 | Canning ..................... 192/224.1 |
| 1,653,662 | A | * | 12/1927 | Ritchie ........................... 83/409 |
| 2,383,276 | A | * | 8/1945 | Smith .......................... 188/82.6 |
| 3,695,316 | A | | 10/1972 | Pluckhahn |
| 3,926,086 | A | | 12/1975 | Crane |
| 3,965,788 | A | | 6/1976 | Granberg |
| 4,235,140 | A | | 11/1980 | Reece |
| 4,245,535 | A | | 1/1981 | Lockwood et al. |
| 4,275,632 | A | | 6/1981 | Ross |
| 4,307,641 | A | | 12/1981 | Shapleigh |
| 4,640,170 | A | | 2/1987 | Bakken |
| 5,213,022 | A | * | 5/1993 | Elgan ............................. 83/797 |
| 5,243,892 | A | | 9/1993 | Jindra |
| 5,697,599 | A | * | 12/1997 | Lamb ........................... 254/328 |
| 5,784,941 | A | | 7/1998 | Sanborn |
| 5,819,626 | A | | 10/1998 | Lucas |
| 6,722,248 | B1 | * | 4/2004 | Johnston, Sr. .................. 83/795 |
| 7,784,387 | B2 | | 8/2010 | Dale et al. |
| 2003/0024371 | A1 | * | 2/2003 | Gibson et al. ................... 83/795 |
| 2006/0117926 | A1 | | 6/2006 | Dale et al. |
| 2007/0234869 | A1 | | 10/2007 | Dale et al. |

FOREIGN PATENT DOCUMENTS

| CA | 2464519 A1 | 5/2003 |
| GB | 537266 A | 6/1941 |

OTHER PUBLICATIONS

Office Action Issued Jul. 23, 2010 in Canadian Appln. Ser. No. 2,687,622.

* cited by examiner

*Primary Examiner* — Stephen Choi
(74) *Attorney, Agent, or Firm* — Panitch Schwarze Belisario & Nadel LLP (57) ABSTRACT

A friction winch and braking system for a sawmill having a cutting mechanism for sawing lumber. The friction winch and braking system allows for easy, one-handed raising and lowering of the sawmill head within the sawmill carriage and the automatic braking of the sawhead at the vertical plane chosen by the operator.

16 Claims, 11 Drawing Sheets

SAWHEAD VERTICAL ADJUSTING FRICTION WINCH AND SELF-LOCKING/BRAKING SYSTEM FOR SAWMILL

BACKGROUND OF THE INVENTION

The present invention relates to a saw head raising/lowering winch and self-locking system for a sawmill. The sawhead vertical adjusting friction winch and self-locking system allows for easy, one-handed raising and lowering of the sawmill head within the sawmill and automatic saw head locking/brake.

There are several prior inventions for portable sawmills.

U.S. Pat. No. 5,784,941 describes a portable sawmill in which the functions of adjusting a cut and making a cut are divided between two separate devices. The invention discloses a vertical chain saw, ideally operated in an upward direction, which moves horizontally along a track, and, as such, does not require the raising or lowering of the chain saw relative to the track.

U.S. Pat. No. 5,243,892 discloses a portable sawmill with a frame base and an inverted U-shaped frame, supported by a carriage rolling along side tracks defined by the frame base. The chain saw is supported by a transversely slidable holder on the cross-beam of the frame. The chain saw is oriented in a vertical direction, and, in use, the log is placed on the U-shaped frame. The chain saw appears to be displaceable in the vertical direction through a vertical guide screw operated by a crank, said guide screw threadably engaging a slide block slidable across a cross beam. Due to the use of a guide screw, the chain saw does not require a tensioning mechanism or a brake on the vertical movement mechanism.

U.S. Pat. No. 4,640,170 discloses a portable sawmill with a frame that surrounds the log. The frame is dragged or slid along a frame supporting surface. The frame holds a chain saw at the two ends of its blade, in horizontal fashion, with chain saw support members. The invention uses sliding means for facilitating the movement of the frame over the log in a horizontal direction, but uses a vertical guide screw and crank mechanism for the vertical displacement of the saw head relative to the frame.

U.S. Pat. No. 4,275,632 describes a portable sawmill comprising a U-shaped support or carriage, holding a band saw. When in use, a log is placed between the two guide rails and is supported in place by a jacking mechanism with adjustable shelves. The band saw is in a generally horizontal position, and does not adjust in a vertical direction; instead, the log itself is moved up and down using a jacking mechanism.

U.S. Pat. No. 4,307,641 describes a portable sawmill comprising two skid rails, vertical support members, a pair of guide rails. The chain saw is held below the guide rails and can be adjusted in its vertical position relative to the skid rails using a set of vertical rod screws operated by a crank mechanism.

U.S. Pat. No. 4,235,140 describes a sawmill having a saw carriage having a vertical slide slidable on a vertical post of the sawmill frame, and adjustable vertically thereof by a cable secured at its upper end to a hook hooked into the top of the post. The lower end of the cable is attached to a reel, rotatable by a manual crank. The reel does not have any form of tensioning mechanism, but instead is fixed in place when the desired vertical location of the vertical slide is selected, using a latching bar which hooks into a path of pins keyed to a shaft on which the reel is mounted. Thus, the latching bar is raised in order to operate the reel (by rotating the reel using a manual crank), and the reel is locked in place by lowering the latching bar, which hooks between two pins, preventing rotational movement of the reel.

U.S. Pat. No. 3,965,788 describes a saw guide for use with a vertically operated portable chain saw. The saw guide comprises support means for the chain saw, to which the saw is attached. The vertical displacement of the chain saw along the support means is by way of a slidable engagement which can be clamped to a desired height using adjusting clamps.

U.S. Pat. No. 3,926,086 describes a portable sawmill that uses a complex pulley system to move the chain saw and supporting platform in a horizontal direction. Vertical displacement of the chain saw relative to the log and sawmill frame is through a pair of transversely-spaced vertically-movable racks having their lower ends operatively connected to the bar of the chain saw, a transverse shaft rotatably mounted on the frame, and a pair of transversely-spaced pinions fastened to the shaft and engaging the tracks. The racks and the attached chain saw is raised or lowered relative to the frame and to the log by rotation of the shaft.

U.S. Pat. No. 3,695,316 describes a portable timber milling jig that uses a carriage, holding a chain saw, axially surrounding a square guide rail. The chain saw is held at an approximately 45 degree angle and only uses one guide rail, and utilizes ball bearings on the carriage to move the carriage with respect to the guide rail. When in use, a log is placed under the guide rail. The carriage can be displaced vertically by sliding it along the guide rail, then can be locked into place.

U.S. Pat. No. 4,245,535 describes a portable sawmill with an elaborate hydraulic apparatus for cutting a log. The hydraulic apparatus, comprising a hydraulic rod and sleeve, is used to raise or lower the saw head relative to the platform.

The LumberLite™ 24 mid-size band sawmill and Lumbermate band sawmill (http://www.norwoodindustries.com) is a portable sawmill having two horizontal bases, each with a wheel assembly providing planar horizontal movement and fitted onto a set of rails of a sawmill base, two vertical saw supports extending vertically from the horizontal bases, and a top cross rail connecting the two vertical saw supports. The sawmill has a rotate rod extending between the vertical saw supports, with a crank handle. The crank handle rotates the rotate rod. The saw head is placed below the rotate rod and slidably affixed to the vertical saw supports such that it can move vertically along the two vertical saw supports. A cable extends between the rotate rod and the saw head, and reels around the rotate rod, lifting or lowering the saw head. The saw head is kept in place using clamps on the saw head affixing it to the vertical saw supports.

There is a need for an improved portable sawmill wherein the vertical displacement of the saw head relative to the carriage is simple, utilizes few moving parts, can be easily and accurately controlled with one hand despite the weight of the saw head, and can be locked and unlocked automatically without additional operator inputs.

BRIEF SUMMARY OF THE INVENTION

The present invention provides a sawmill carriage for use on a sawmill base and with a saw head, comprising a horizontal base having an assembly which provides planar horizontal movement when fitted onto a set of rails of a sawmill base; a vertical saw support having a horizontal base, and extending vertically therefrom; a cross rail attached to the first vertical saw support whereby the vertical saw support and the cross rail form a rigid frame; a rotate rod extending horizontally from said vertical saw support, said rotate rod capable of axial rotation; at least one lift configured to raise or lower the saw head when said rotate rod is rotated; and friction winch/brake assembly capable of frictionally imparting an adjustable resistance to the axial rotation of the rotate rod. By the present invention, a saw head can be slidably affixed to said rigid frame and affixed to the second cable end, such that rotation of the rotate rod displaces the saw head in a generally vertical direction.

The lift may be one or more of the following alternatives: a cable, a gear, a ratchet, and a slide. In one preferred embodiment, the lift is a lift cable comprising a first cable end and a second cable end, wherein said lift cable is configured to wrap or unwrap around the rotate rod when said rotate rod is rotated. In this embodiment, there can be a pulley system through which the lift cable is fed for converting displacement of the cable into a generally vertical direction.

In one preferred embodiment, the adjustable resistance to the axial rotation of the rotate rod can be directionally biased such that greater resistance is provided to clockwise axial rotation than to counterclockwise axial rotation, or vice versa.

In a preferred embodiment, the friction winch/brake assembly comprises: a friction winch cable affixed at a proximal end to a fixed anchor point located on the saw rod support, and affixed at a distal end to an adjustable anchor point also located on the saw rod support; adjusting means capable of displacing said adjustable anchor point and thus adjusting tension in said tensioning cable; wherein the friction winch cable is wrapped at least once around said rotate rod. The friction winch cable could also be wrapped more than once around said rotate rod.

In a preferred embodiment, the adjustable anchor point is a floating anchor point and the adjusting means comprises a handwheel biased by a spring such that tightening said handwheel compresses said spring and displaces said floating anchor point towards said handwheel.

The sawmill carriage of the invention could be cranked by a crank having a crank handle, operatively connected to the rotate rod and capable of rotating the rotate rod axially when rotated, or by a motor.

Thus, the present invention also teaches a sawmill comprising: a sawmill base having a set of rails and support for said rails; a sawmill carriage of the invention, positioned on said sawmill base such that the carriage is capable of running along the rails and providing planar horizontal movement of the base; and a saw head slidably affixed to the vertical saw support, such that rotation of said rotate rod raises or lowers said saw head.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

The present invention enables a user to adjust and secure the height of a saw head without the use of clamps, which require multiple steps to adjust, thus delaying the task and creating the opportunity for operator error.

The present invention provides a simple, versatile, cost-effective and portable sawmill which can be readily assembled, disassembled, carried, and used by one person. It is particularly suitable for use by hunters, "do-it-yourselfers," and people situated in remote areas, who need to saw boards, clapboards, shingles, etc. The sawmill's design of the present invention enables it to be manufactured from extremely sturdy, reasonably inexpensive materials.

While there are several prior inventions for portable sawmills, none provide the advantages of the present invention, which has several inventive features not found in the prior art. Notably, the present invention allows for easy vertical adjustment of the saw head using only one hand, and in a manner which allows automatic locking of the saw head at any selected vertical position with out need for additional operator steps or complex equipment. The present invention is directed to a specific part of the sawmill, notably, the carriage. However, a sawmill having said carriage would also be considered an embodiment of the invention claimed, as would the carriage having a saw head attached.

An embodiment of the present invention will now be described as shown in FIGS. 1-11.

Figure 1:
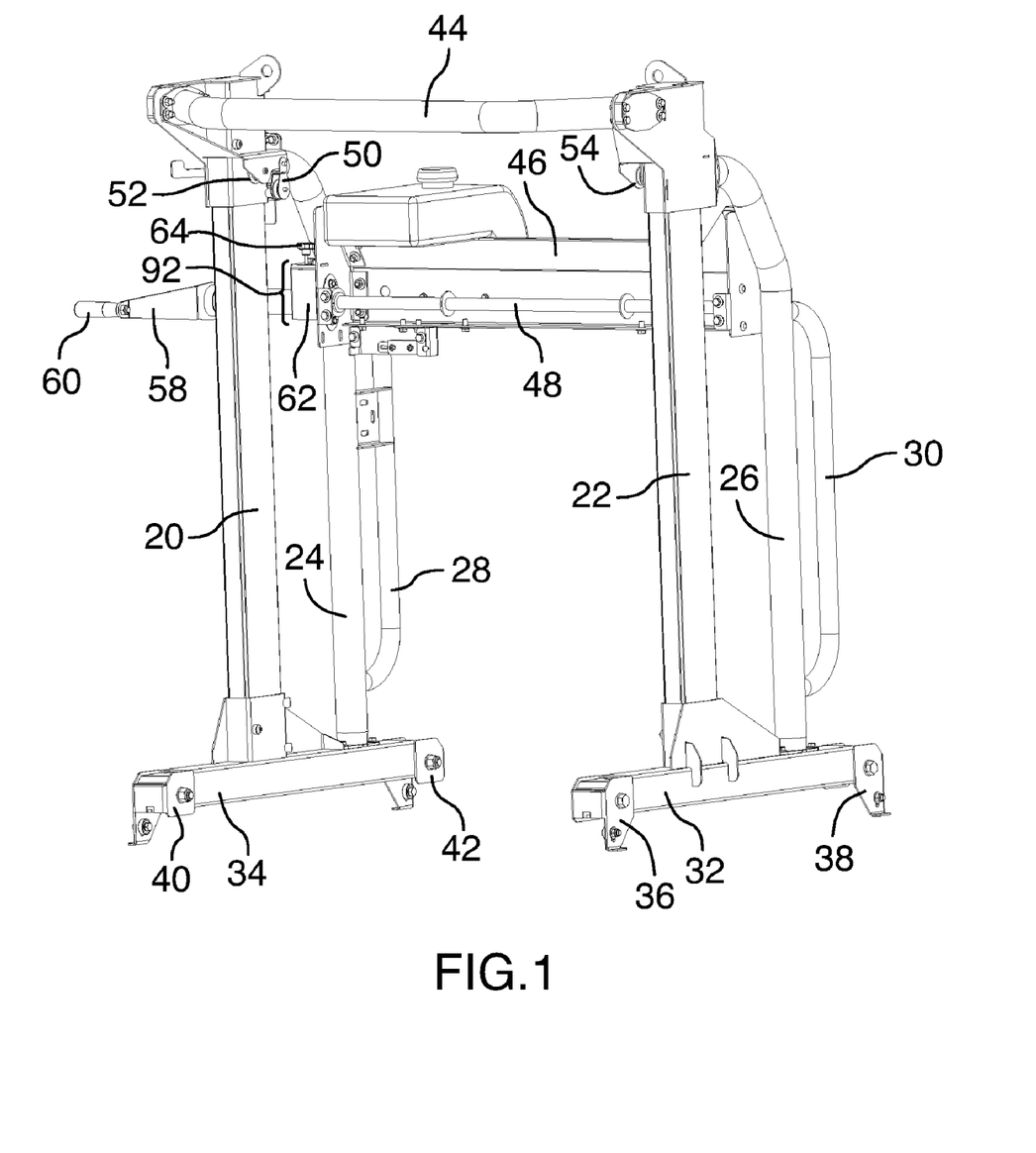
FIG. 1 is a front perspective illustration of a sawmill carriage, which is one aspect of the present invention, and is labeled with its major components.
Figure 2:
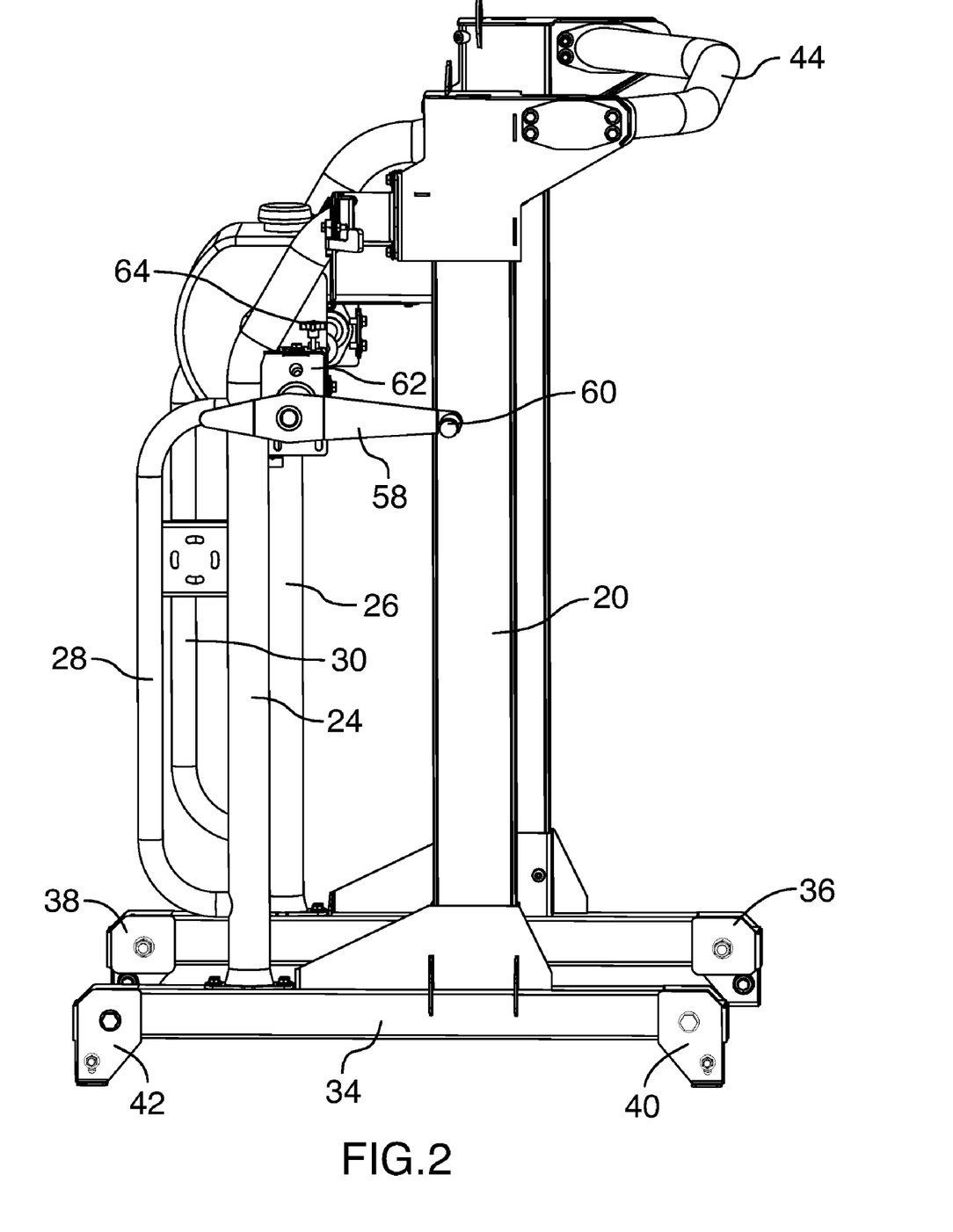
FIG. 2 is a right side perspective view of the sawmill carriage of FIG. 1.
Figure 3:
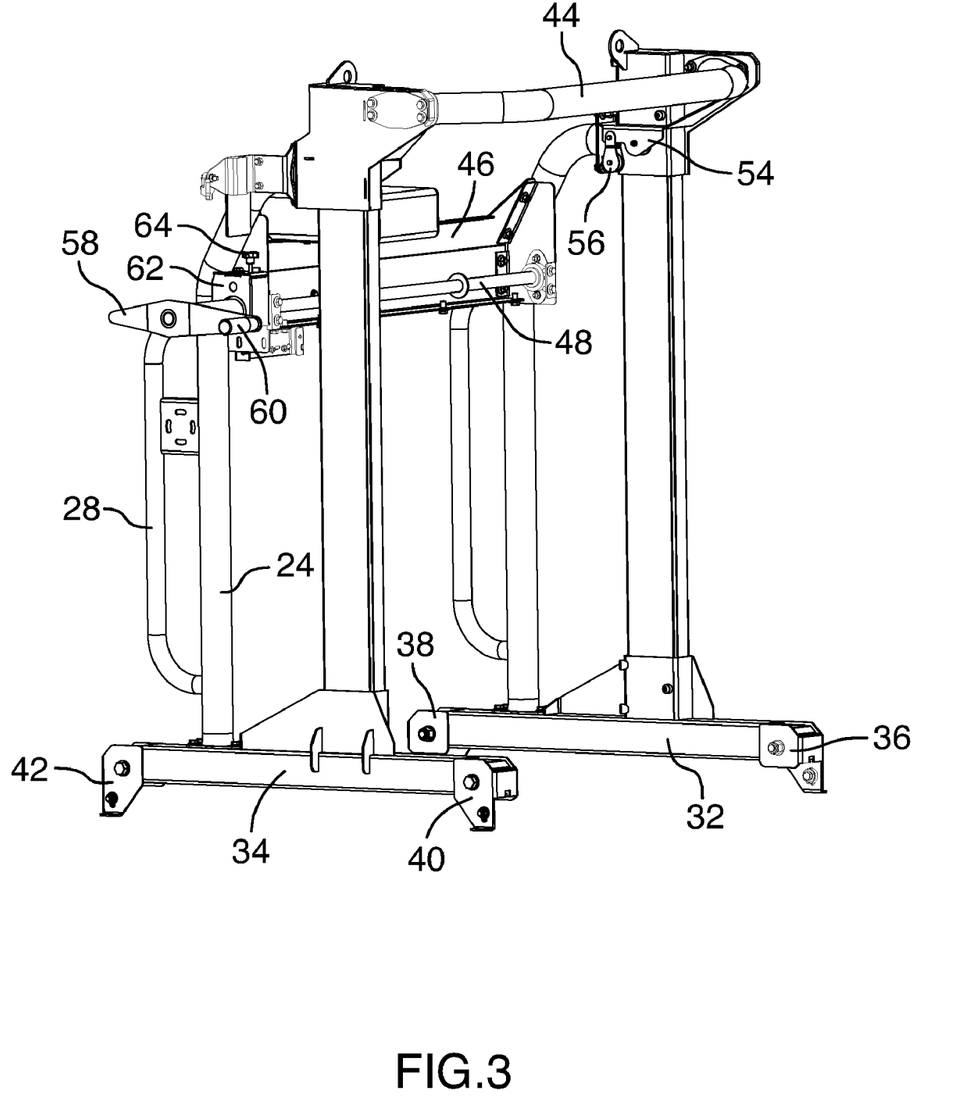
FIG. 3 is a right front perspective view of the sawmill support frame carriage of FIG. 1.
Figure 4:
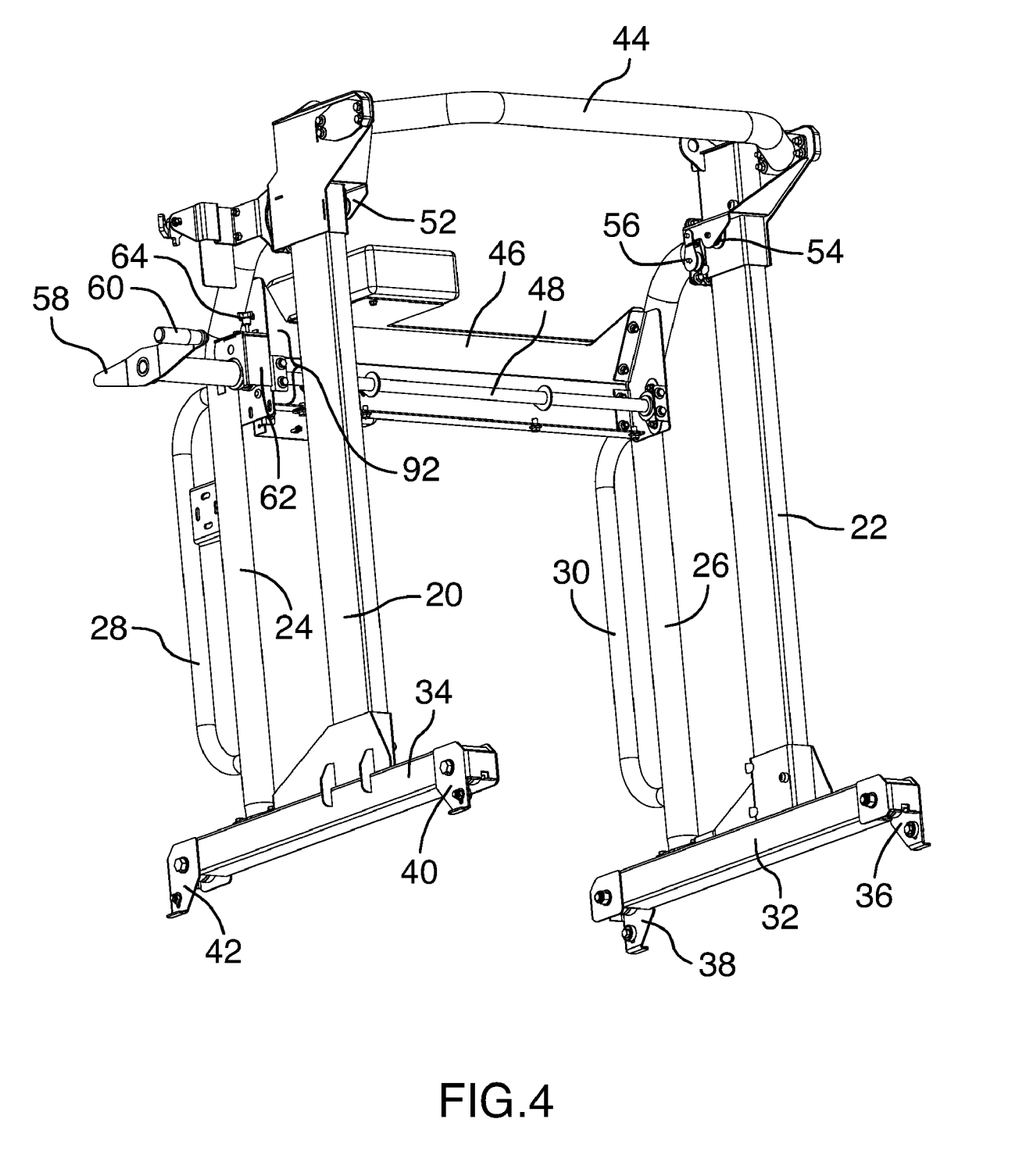
FIG. 4 is a rear bottom perspective view of the sawmill support frame carriage of FIG. 1.
Figure 5:
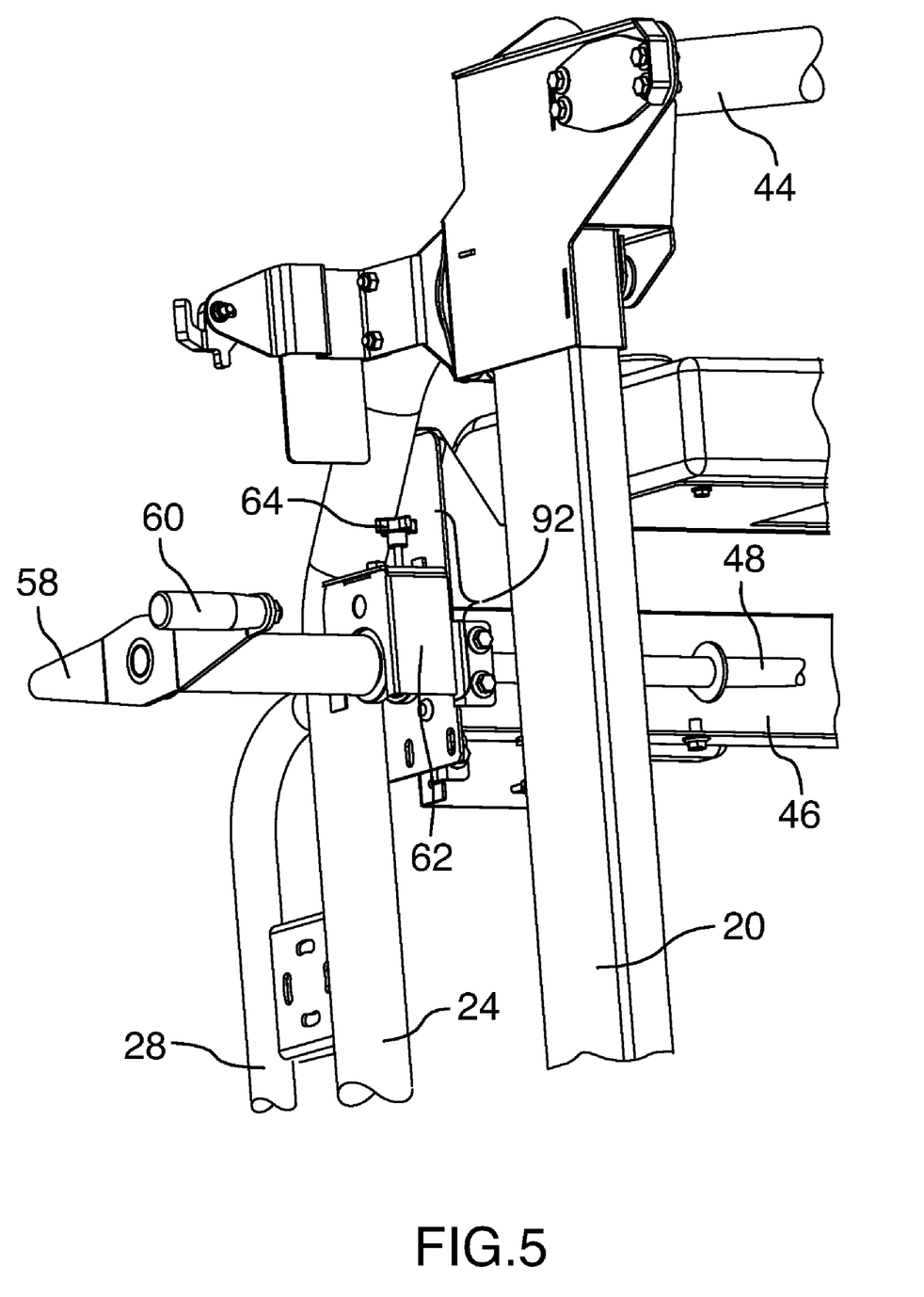
FIG. 5 is a front right perspective view of a detail of a portion FIG. 4, showing the friction winch/brake assembly in more detail.
Figure 6:
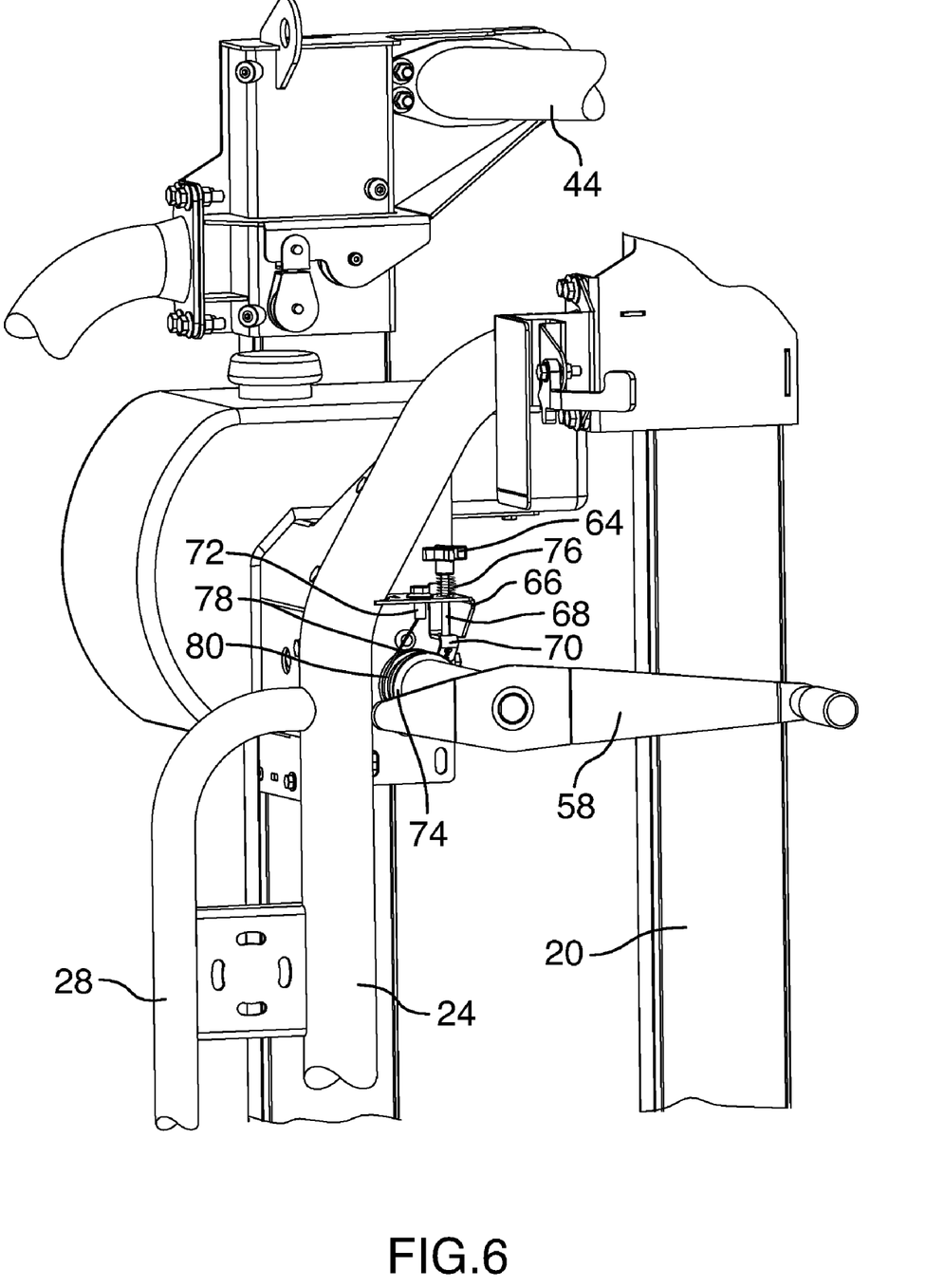
FIG. 6 is a rear right perspective view of a detail of the friction winch/brake assembly portion of the sawmill carriage, with the brake assembly cover removed so internal components can be seen.
Figure 10:
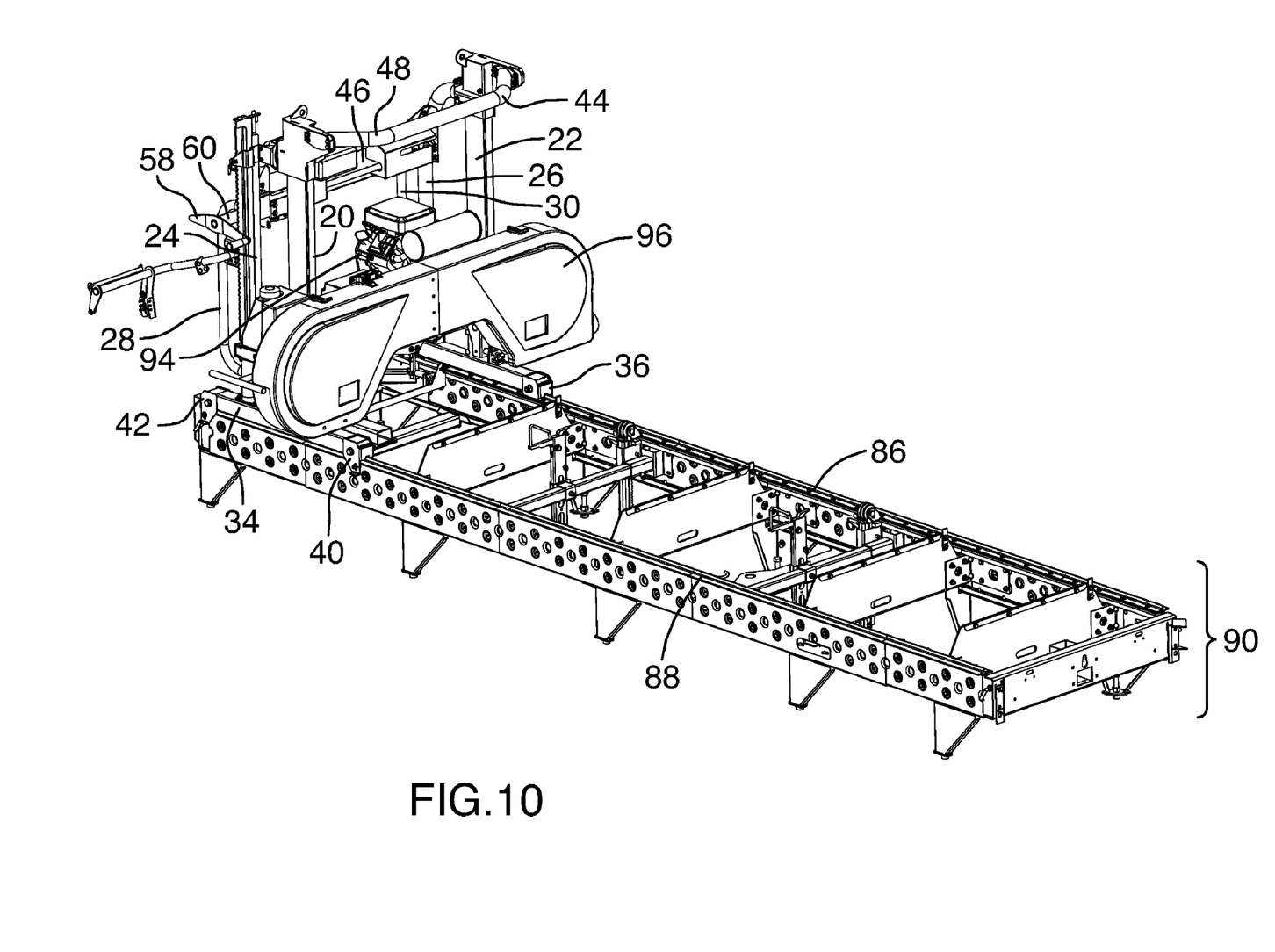
FIG. 10 is a front right perspective view of the sawmill support frame carriage on a sawmill base and having a saw head installed thereon.
Figure 11:
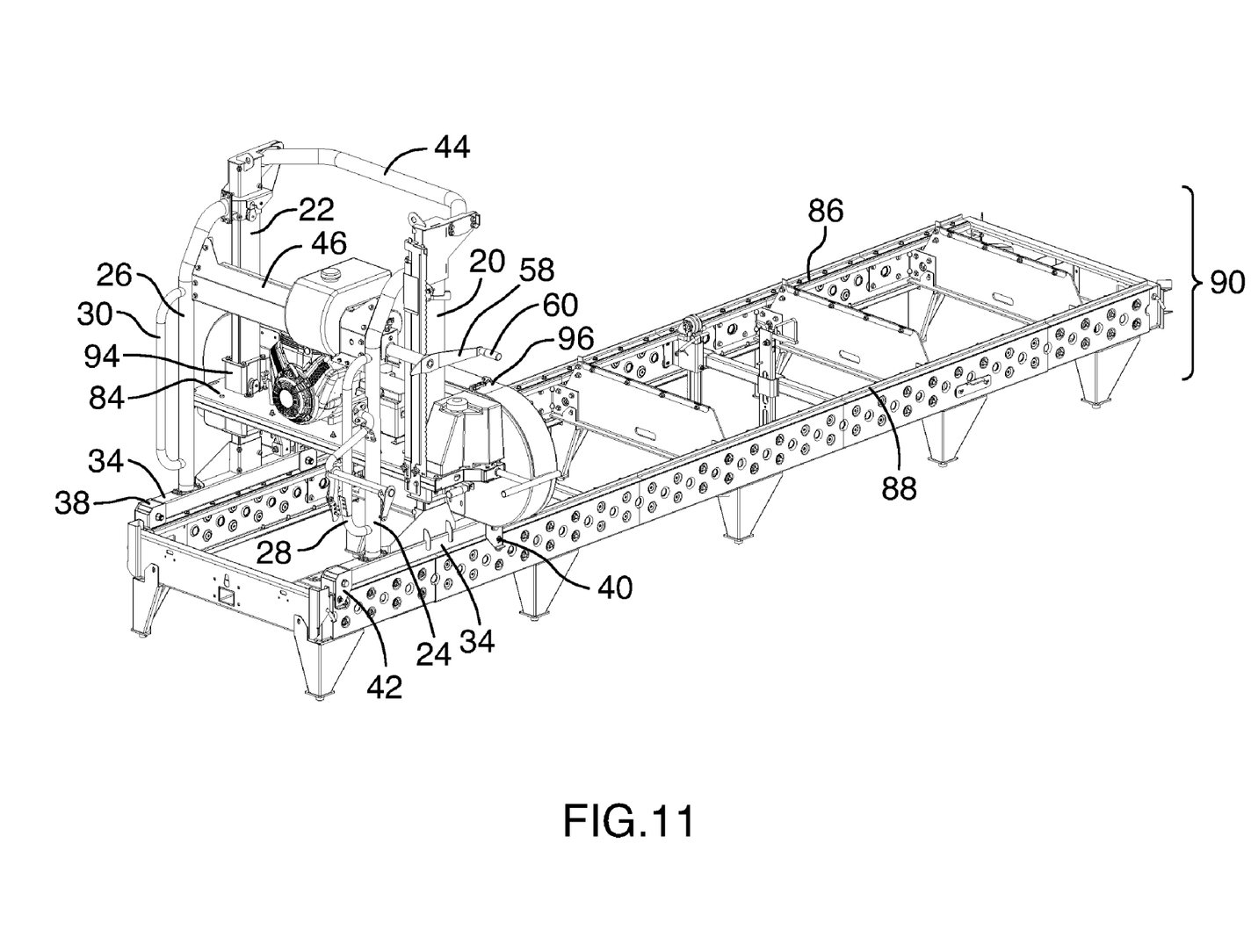
FIG. 11 is a rear right perspective view of the sawmill support frame carriage on a sawmill base having a saw head installed thereon.

FIGS. 1-4 provide a perspective view of a portable sawmill carriage that incorporates features of the present invention. FIG. 1 does not show all of the parts of the sawmill, but rather identifies one of the sawmill's major components, notably, the carriage. FIGS. 5-8 provide an enlarged portion of the friction winch/brake assembly of the sawmill of FIGS. 1-4. FIGS. 6-9 provide a view of the friction winch/brake assembly with a friction winch cable and friction winch drum in place. FIGS. 10 and 11 show the sawmill carriage in context, on a sawmill base and having a saw head attached thereto.

The carriage is supported on two horizontal bases 32, 34 which, as shown, have wheel assemblies 36, 38, 40, 42. The wheel assemblies 36, 38, 40, 42 comprise wheels for horizontal displacement of the carriage. In use, the horizontal bases 32, 34 are placed on horizontal rails 86, 88 which allow the horizontal movement of the entire carriage on a horizontal plane across sawmill base 90. Mounted onto horizontal bases 32, 34 and extending upwards in a vertical direction are vertical saw support 22 and 20, respectively. Also mounted onto horizontal bases 32, 34 and extending upwards in a vertical direction are support posts 26, 24, respectively. The support posts 26, 24 curve towards, and are attached to the top of vertical saw supports 22, 20. Attached to support posts 26, 24 are hand rails 30, 28 (respectively) which run parallel to the support posts 26, 24 for the majority of their length, but curve towards, and are attached to, support posts 26, 24.

Cross rail 44 extends between the top of vertical saw support 20 and vertical saw support 22, forming a frame therewith. Saw rod support 46 extends between the top of support post 24 and support post 26 to form a frame therewith. Saw rod support 46 also acts as a protective cover for rotate rod 48, which extends between support post 24 and support post 26. Rotate rod 48 is capable of axial rotation, and can be turned using crank handle 60, attached to crank 58 which is in turn attached to the rotate rod 48. Note that saw rod support 46 is an optional element: the rotate rod could extend between support post 24 and support post 26, or, in an alternative embodiment (not shown), could extend between the vertical saw supports 22, 20.

Figure 12:
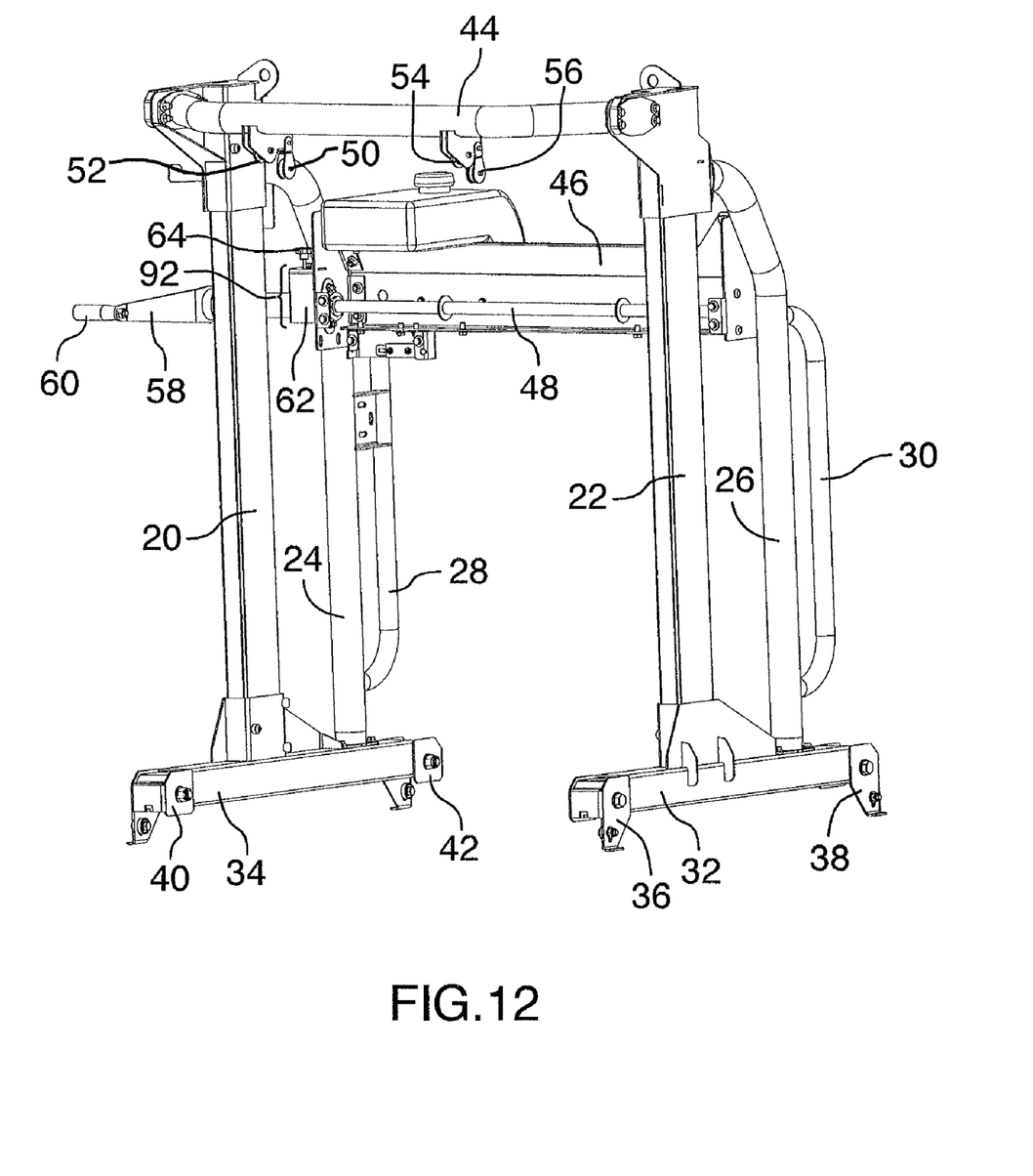
FIG. 12 is a front perspective view of the sawmill carriage according to another preferred embodiment.

As best seen in FIGS. 10 and 11, a saw head 84 is the plate stack that the engine 94 sits on, attached to vertical saw supports 20, 22 and is capable of slidable engagement therewith in a vertical direction. Engine 94 operates a band, chain, or other saw, typically covered by guard 96. Saw head 84 is attached to one end of a cable (not shown). Optionally and as shown, the cable threads through pulley 52 and pulley 50 and is then wrapped around one side of rotate rod 48. A second cable is similarly connected to the saw head 84 and threads through pulley 54 and pulley 56, wrapping around the opposing side of rotate rod 48. As would be understood by a person of skill in the art, the pulley system may not be necessary, depending on the location of rotate rod 48 and the weight of saw head 84. As shown in FIG. 12, the pulley 54 may be affixed to the cross rail 44.

Thus, the turning in one direction of crank handle 60, which, in turn rotates crank 58 and rotate rod 48, reels both cables around rotate rod 48, which in turn raises the saw head 84. The turning of the crank handle 60 in the other direction unreels the cables and lowers the saw head.

The friction winch/brake assembly 92 provides an adjustable tensioning of rotate rod 48. This adjustable tensioning results in variable resistance to the axial rotation of rotate rod 48. This, in turn, allows for a variable amount of energy required to vertically displace saw head along the vertical saw supports 20, 22. For example, the friction winch/brake assembly 92 can be adjusted so that the resistance to axial rotation of rotate rod 48 is at a level where crank handle 60 can be used to rotate rotate rod 48, but that gravitational force, or forces imposed by the action of the blade sawing through the log, acting on the saw head 84, are not sufficient to displace the saw head 84 in a downwards or upwards direction. Thus, the user can adjust the friction winch/brake assembly 92 to the appropriate tension, then move the saw head 84 up or down using crank handle 60 with the minimum energy required while still having enough resistance to the axial rotation of rotate rod 48 to keep the saw head 84 from falling or slipping downwards or creeping up during sawing operations. Once the saw head 84 is at the desired vertical position, the user can release crank handle 60 and the tension on rotate rod 48 will be sufficient to prevent downward or upward displacement of the saw head 84.

Alternatively, a user can increase tension on the friction winch/brake assembly 92 such that the friction winch/brake assembly 92 acts as a brake, preventing or rendering very difficult the operation of crank 58. For example, the friction winch/brake assembly 92 can be loosened (as described further below), the user can rotate crank handle 60 to move the saw head 84 to the appropriate vertical position, then the friction winch/brake assembly 92 can be re-tightened (as described further below).

As shown, but in an optional embodiment, the friction winch/brake assembly 92 is biased in that it provides more tension in one direction of axial rotation of the rotate rod 48 than the other. As described further below, friction winch/brake assembly 92 comprises a tensioning cable 82 which is wrapped around the rotate rod 48. Depending on the direction the tensioning cable 82 is wrapped, increased tension is provided in one of the two rotation directions. For example, rotation of tensioning cable 82 in a counter clockwise direction around rotate rod 48 will create more resistance to clockwise rotation of the rotate rod 48 than counter clockwise rotation of rotate rod 48.

Figure 7:
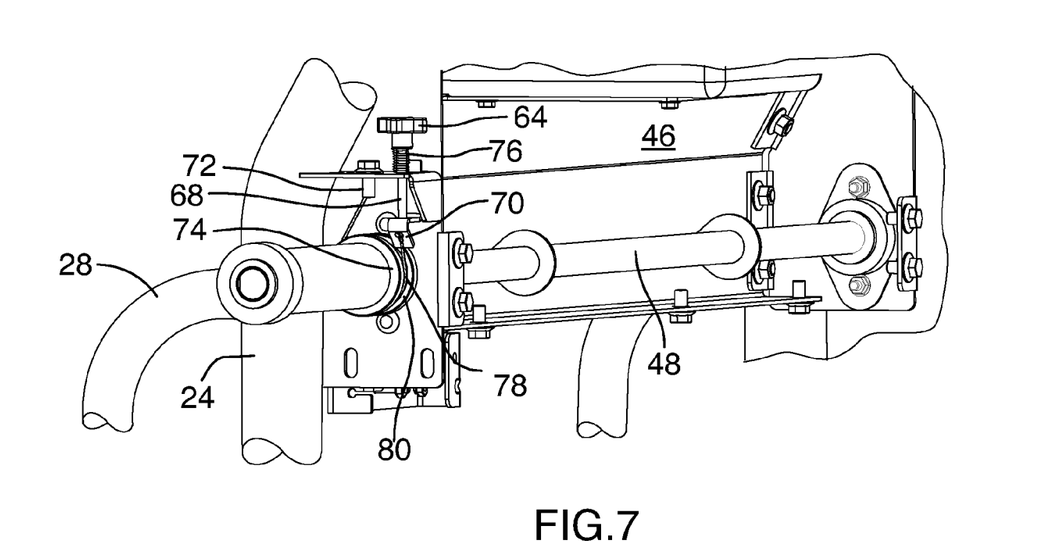
FIGS. 7 and 8 are alternate views of FIG. 6.
Figure 8:
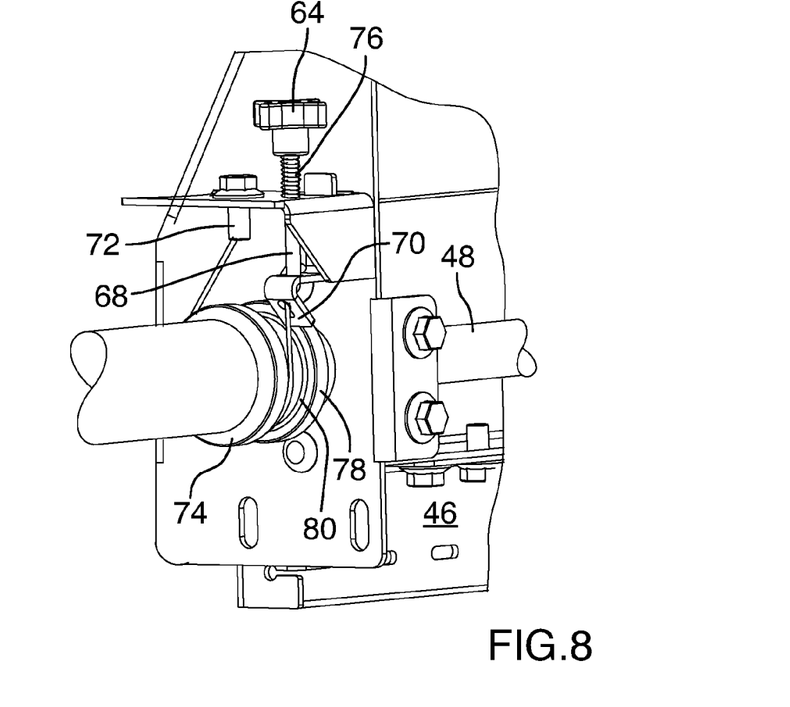
Figure 9:
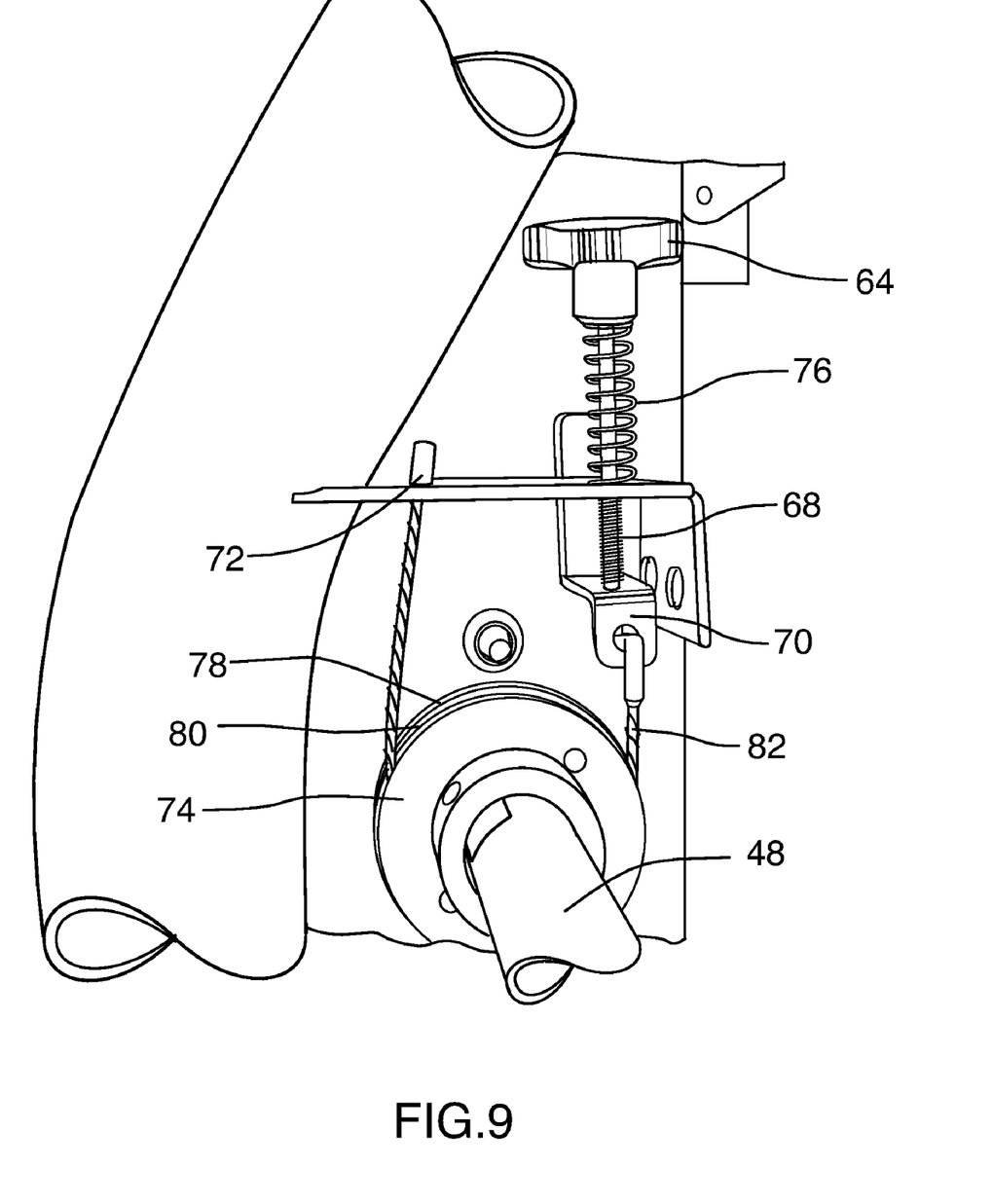
FIG. 9 is a side view of an alternate embodiment of the friction winch/brake assembly portion of the sawmill support frame carriage, with the brake assembly cover removed so internal components can be seen.

As best seen in FIG. 7, the friction winch/brake assembly is described as follows. Rotate rod 48 comprises drum 80 having collars 74, 78. The drum 80 is fixed to rotate rod 48 and rotates therewith. Drum 80 is housed within brake assembly cover 62, which is removable, and typically (and as shown) attached to saw rod support 46. Tensioning cable 82 wraps around drum 80 at least one full wrap, and optionally more than one full wrap, between collar 74 and collar 78. One end of tensioning cable 82 is attached to a fixed anchor point 72, located on the saw rod support 46, for example (and as shown) to a non-removable portion of the friction winch/brake assembly 92 that is attached thereto. The other end of the tensioning cable 82 is attached to a floating anchor point 70 connected to handwheel 64. The handwheel 64 is biased by spring 76 such that tightening the handwheel 64 compresses the spring 76 and provides tension on tensioning cable 82. In this manner, the frictional tension provided to drum 80 by tensioning cable 82 can be adjusted by tightening handwheel 64.

In use, a person operating the sawmill will need to raise and lower saw head 84 to adjust thickness of the cut of the log. The person operating the sawmill will tighten the handwheel 64 to a position wherein the saw head 84 does not fall or rise due to gravitational force or forces exerted during milling. Typically, the person operating the sawmill can then adjust the vertical position of the saw head 84 using minimal effort by turning crank handle 60. Since the tensioner/brake is slightly biased in one direction, the user can easily lift the saw head 84, by turning crank handle 60, since the tensioner does not add significant tension in this direction of movement of the rotate rod 48. The user can also lower the saw head 84 quite easily, since the tension provided by the tensioner/brake is largely counteracted by gravitational force on saw head 84. The user can also "lock" the saw head 84 in place by tightening hand wheel 64 even further, or, optionally (and not shown) by using clamps on the saw head 84 itself, which clamp the saw head 84 to the saw supports 20, 22. Thus the present invention enables the user to adjust and secure the height of the saw head without the use of clamps, which require multiple steps to adjust, thus delaying the task and creating the opportunity for operator error.

However, this "biasing" effect is secondary to the winch brake friction, which exists regardless of the bias or the direction in which the cable is wound. The gripping and braking action is a result of the friction between the cable and drum. The tighter the cable, the more friction occurs. If hand wheel 64 is loosened, the amount of friction between friction winch cable 82 and friction winch drum 80 is reduced, and the rotate rod 48 can turn easily, raising or lowering the sawhead. If hand wheel 64 is tightened, the amount of friction between friction winch cable 82 and friction winch drum 80 is increased, and the rotate rod 48 is braked or even locked, preventing the raising or lowering of the sawhead. The system works by the selection of the desired degree of tension being placed by the spring on the end of cable 82 such that it holds the sawhead against gravity and forces exerted during milling, but the tension remains light enough that the operator can overcome the force of friction using the crank handle. As soon as he finishes overcoming the frictional forces, up or down, the spring's tugging on the end of the cable resumes its hold. The operator can adjust the amount of friction by adding tension to the spring by turning the knob.

While the winching action provided in the present example, in this instance by 58 and 60, is manual, other winching action can be used, for, for example, electric or gas powered motors.

Also, while the present example teaches the use of cables and pulleys to lift the sawhead, it will be appreciated that other systems of lifting and lowering the sawhead can be used in association with the present braking system, for example, chains and/or gears, and/or a ratchet, and or a slide fit.

In another embodiment (not shown), in the case of a large saw head 84, the saw head 84 can slidably engage with both the vertical saw supports 20, 22 and the support posts 24, 26.

It is to be understood that the present invention is not limited to the embodiments described above, but encompasses any and all embodiments within the scope of the following claims.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A sawmill carriage for use on a sawmill base and with a saw head, comprising:
   a horizontal base having an assembly which provides planar horizontal movement when fitted onto a set of rails of a sawmill base;
   a vertical saw support having a horizontal base and extending vertically therefrom;
   a cross rail attached to a first vertical saw support;
   whereby the vertical saw support and the cross rail form a rigid frame;
   a rotate rod extending horizontally from said vertical saw support, said rotate rod being capable of axial rotation;
   at least one lift cable configured to raise or lower the saw head when said rotate rod is rotated; and
   a friction winch/brake assembly capable of frictionally imparting an adjustable resistance to the axial rotation of the rotate rod;
   said saw head being slidably affixed to said rigid frame and affixed to the lift cable such that rotation of the rotate rod displaces the saw head in a generally vertical direction.

2. The sawmill carriage of claim 1, further comprising a saw rod support which houses the rotate rod.

3. The sawmill carriage of claim 2, wherein the lift cable comprises a first cable end and a second cable end, wherein said lift cable is configured to wrap or unwrap around the rotate rod when said rotate rod is rotated.

4. The sawmill carriage of claim 3, further comprising a pulley system through which the lift cable is fed for converting displacement of the cable into a generally vertical direction.

5. The sawmill carriage of claim 4, wherein the pulley system is affixed to the vertical saw support.

6. The sawmill carriage of claim 4, wherein the pulley system is affixed to the cross rail.

7. The sawmill carriage of claim 1, wherein adjustable resistance to the axial rotation of the rotate rod is directionally biased such that greater resistance is provided to clockwise axial rotation than to counterclockwise axial rotation, or vice versa.

8. The sawmill carriage of claim 2, wherein the friction winch/brake assembly comprises:
   a friction winch cable affixed at a proximal end to a fixed anchor point located on the saw rod support, and affixed at a distal end to an adjustable anchor point also located on the saw rod support;
   a screw capable of displacing said adjustable anchor point and thus adjusting tension in said lift cable;
   wherein the friction winch cable is wrapped at least once around said rotate rod.

9. The sawmill carriage of claim 8, wherein the friction winch cable is wrapped at least twice around said rotate rod.

10. The sawmill carriage of claim 8, wherein the adjustable anchor point is a floating anchor point and the screw comprises a handwheel biased by a spring such that tightening said handwheel compresses said spring and displaces said floating anchor point toward said handwheel.

11. The sawmill carriage of claim 8, further comprising a drum having at least two collars, affixed to and rotationally engaging said rotate rod, wherein the friction winch cable is wrapped around said drum and between said two collars.

12. The sawmill carriage of claim 1, wherein said vertical saw support comprises a first vertical saw support and a second vertical saw support, and said cross rail and said rotate rod extend from said first vertical saw support to said second vertical saw support.

13. The sawmill carriage of claim 1, further comprising a crank having a crank handle operatively connected to the rotate rod and capable of rotating the rotate rod axially when rotated.

14. The sawmill carriage of claim 1, wherein vertical displacement of said saw head relative to said carriage is configured to be controlled with only one hand of an operator.

15. The sawmill carriage of claim 1, wherein said friction winch/brake assembly provides automatic braking of said saw head at a vertical plane chosen by an operator.

16. A sawmill comprising:
   a sawmill base having a set of rails and support for said rails;
   the sawmill carriage of claim 1, positioned on said sawmill base such that the sawmill carriage is capable of running along the rails and providing planar horizontal movement of the sawmill base;
   a saw head slidably affixed to the vertical saw support such that rotation of said rotate rod raises or lowers said saw head.

* * * * *